United States Patent [19]

Asija

[11] 3,796,862

[45] Mar. 12, 1974

[54] BAR CODE READER

[75] Inventor: Satya P. Asija, Kettering, Ohio

[73] Assignee: The National Cash Register Company, Dayton, Ohio

[22] Filed: Sept. 27, 1971

[21] Appl. No.: 184,014

[52] U.S. Cl. 235/61.11 E, 340/146.3 Z, 250/219 D

[51] Int. Cl. .......... G06r 7/10

[58] Field of Search .......... 235/61.11 E, 61.11 D; 340/146.3 Z; 250/219 D, 219 DC

[56] References Cited

UNITED STATES PATENTS

| | | | |
|---|---|---|---|
| 3,676,644 | 7/1972 | Vaccaro et al. | 340/146.3 Z |
| 3,562,494 | 2/1971 | Schmidt | 235/61.11 E |
| 3,604,899 | 9/1971 | Donohoe | 235/61.11 E |
| 3,604,941 | 9/1971 | Crum | 235/61.11 E |
| 3,225,175 | 12/1965 | Hyypolainen | 235/61.11 D |

*Primary Examiner*—Thomas A. Robinson
*Attorney, Agent, or Firm*—Neuman, Williams, Anderson & Olson

[57] ABSTRACT

A bar code reader for optically reading the visual two-bar code used for Postal Service applications is described. The reader employs two photosensors and relatively simple logic circuitry which has increased noise immunity and facilitates real time operation.

3 Claims, 5 Drawing Figures

BAR CODE READER

BACKGROUND OF THE INVENTION

1. Field of the Invention

This invention relates to visual code readers and particularly to a bar code reader for postal uses.

2. Brief Description of the Prior Art

The United States Postal Service has established a standard bar code which is imprinted on envelopes to facilitate mechanical mail handling, sorting and the like. The code contains all the address information normally printed or written on envelopes and, therefore, enables complete mail processing when used together with suitable machinery.

The prior art attempts to read the Postal Service code, and other similar codes, have generally been extremely complex requiring on the order of twenty photocells and complex analogue and associated logic circuitry.

SUMMARY OF THE INVENTION

The bar code reader of this invention uses two photosensors instead of the twenty or more usually required. The signals generated by the two sensors are processed by a unique logic circuit which facilitates real time reading at high speeds. The logic circuit additionally is more immune to noise and facilitates economy of computer processing time.

DETAILED DESCRIPTION OF THE PREFERRED EMBODIMENT

Figure 1:
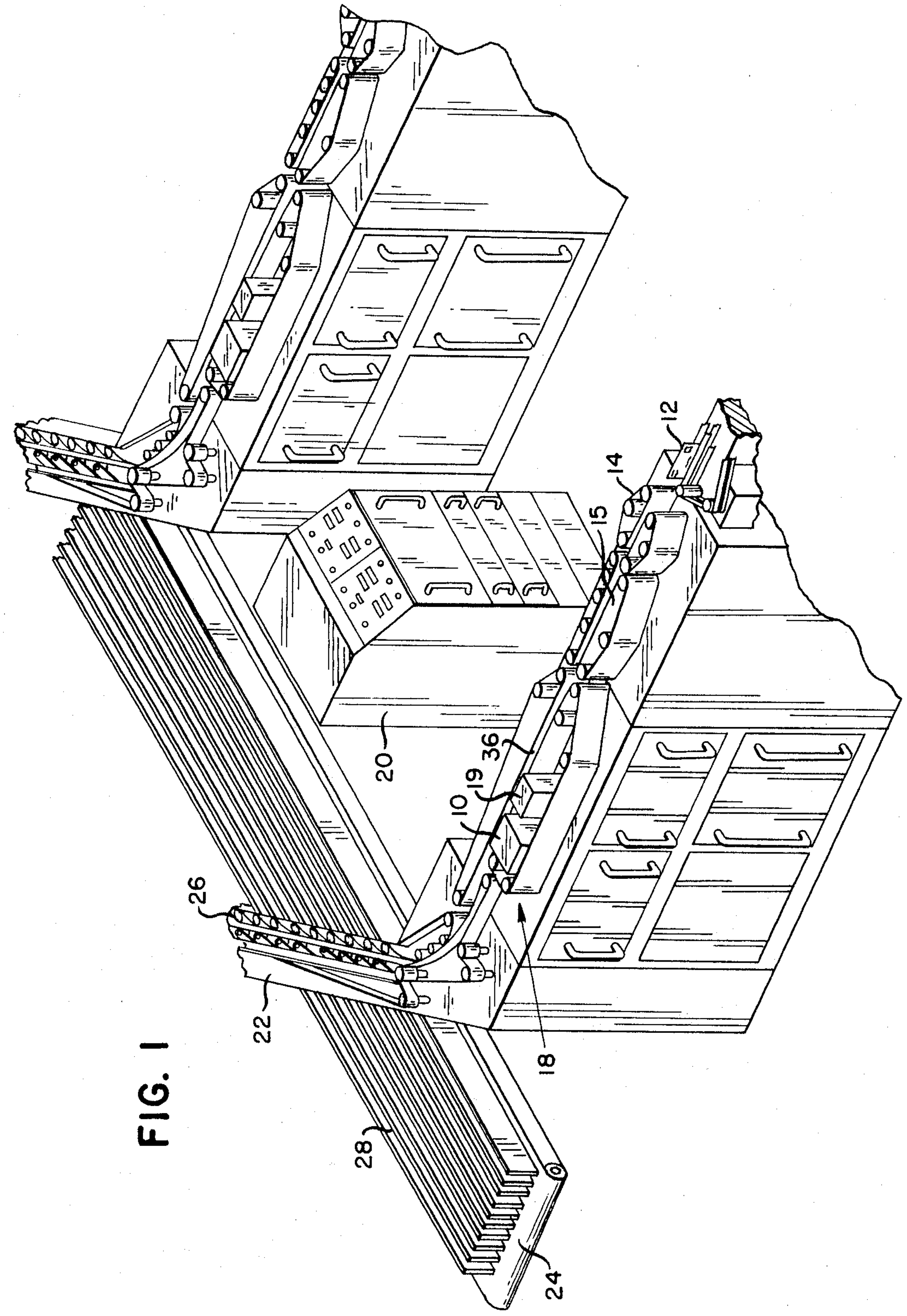
FIG. 1 is a perspective drawing of a code printer-reader-sorter system with which the present invention is employed.

The system shown in FIG. 1 is a postal bar code printer-reader-sorter with which the invention may be used. In general, a number of such systems will be employed at the letter sender's Postal office (two are shown in FIG. 1).

The illustrated system includes a belt-driven mechanism for transporting envelopes or other kinds of mail through various processing stages. The first stage, at the right-hand side of the drawing, receives letters 12 from an OCR (optical character reader, not shown), which reads the address written on the envelope and supplies an appropriately coded output signal containing the address information to the control circuitry 20. The OCR can be used when the addresses are typed or otherwise printed on the envelopes in a form acceptable for OCR handling; otherwise, a human operator may have to read the address and manually operate the control circuitry. Philco Automatic Electronic Address Readers are typical of the OCR's which may be used. The Philco readers read each letter address at a rate of six addresses per second and eject these letters synchronously at a velocity of approximately 192 inches per second.

The letters 12 are directed into a speed-reducing mechanism 14 which reduces the letter velocity to approximately 108 inches per second, and a leveler 15 which aligns the letter to facilitate handling by the encoder station 18. The encoder 18 includes a bar code printer 19 and the bar code reader 10 constructed according to the present invention. The printer, by way of example, may be an A. B. Dick VIDEOJET printer made for Postal Service requirements; the bar code reader will be described in detail below.

By the time the letters 12 reach the encoder station 18, the circuitry associated with the OCR has processed the address information which is to be printed on the envelope. The control unit 20 transmits the data to the printer 19 which prints the data on the envelope in the bar code specified by the Postal Service format (see FIG. 2). The envelope 12 then moves into the bar code reader 10.

The reader 10 scans the bar code as the letter 12 moves by. The signal generated by the reader 10 is transmitted to the control circuitry 20 which in turn operates a diverter unit 22. The letter is turned 60 degrees as it moves past a sensing photodetector (not shown) into the diverter unit 22. The diverter 22 cuts diagonally across a presort belt 24 in order to direct sorted letters through various gating devices 26 and into the proper slots 28. The belt 24 carries the letters to additional postal processing equipment.

The system shown in FIG. 1 is an example of one use for the bar code reader of this invention. Other pieces of mail-processing equipment may also use the reader. For example, the receiving Postal Service may use bar code readers to sort incoming mail. In any event, the mechanical details of the equipment necessarily correspond to the particular application of the reader and are not part of this invention.

Figure 2:
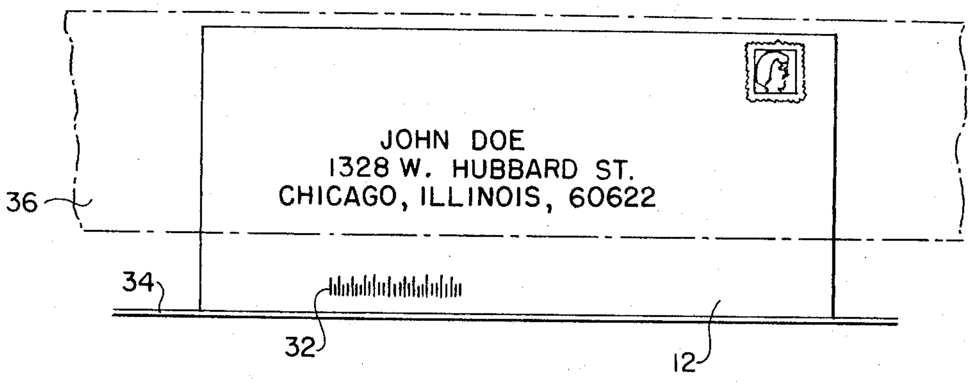
FIG. 2 is an illustrative drawing of an envelope with an imprinted bar code.

FIG. 2 illustrates an envelope 12 printed with the Postal Service bar code 32 as it travels along a suitable guide member 34 between the belts 36 of the encoder station 18 in front of the reader 10.

The Postal Service specification for the two-bar code 32 requires that the code bars be printed in a black ink on the face of the envelope, as shown in the figure. A full bar, or "1" bit, is 0.100 (±0.010) inch in height. A half bar, or "0" bit, is 0.050 (±0.010)inch in height. The bar width and space widths are each 0.010 (±0.003) inch. The bars are equally spaced on 0.020-inch centers within 0.002 inch of true position, at a 50-bar per inch packing density. The bar-to-bar vertical position is within 0.005 inch, as measured from the same base-line, and the bar centerlines are parallel within 1.0 degree. The tangent to the bar pattern centerline does not vary by more than 2.0° from the bottom edge of the mailpiece.

The particular kind of code used to define the address information is not important for purposes of this invention. In other words, any selected arrangement of bars may be read with the reader of this invention.

Figures 3, 4:
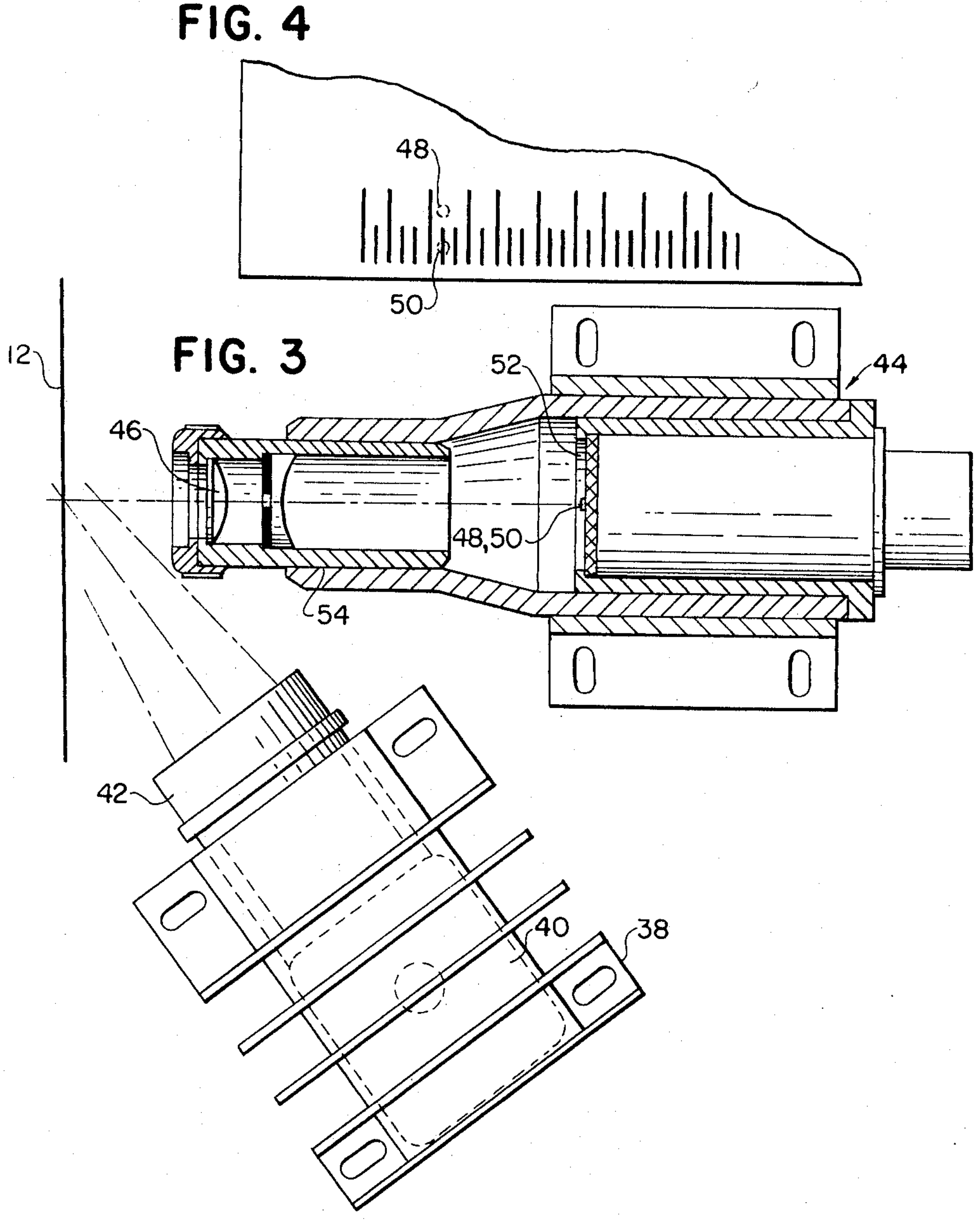
FIG. 3 is a partially sectional view of a light source and detector construction which may be used in conjunction with the bar code reader of the invention.
FIG. 4 is a representative diagram illustrating the approximate positioning of two photosensors according to the present invention.

An optical system used in reading the bar code is shown in FIG. 3. The system includes a light source 38 which houses a lamp 40 and an imaging lens system 42. A lamp that has been found particularly suitable is a G.E. compact tungsten iodide lamp (G.E. lamp No. 1974). The lamp axis is positioned at approximately 45° to the plane of letter 12 and is spaced approximately 3 inches from the letter; the imaging lens 42 is approximately 1 inch from the lamp 40.

A photodetector unit 44 is positioned at a right angle to the plane of the letter 12 to receive the nonspecular light reflected from the bar code printed on the letter. By detecting only nonspecular light, adverse lighting variations caused by glare or surface roughness of the letter are reduced to a minimum. The photodetector 44 includes an imaging lens 46 which forms an image of the bar code on two photodetectors 48, 50 supported on a suitable member 52. A cylindrical lens 54 is provided between the imaging lens 46 and the focal plane to "smear" the bar code slightly. Smearing has been found helpful in situations where each bar of the code is made up of discrete dots which do not always blend together on the envelope. The photodetectors 48, 50 are conventional silicon photodiodes.

As the letter moves past the axis of the photodetector 44, the bar code is imaged onto the photodiodes 48, 50, as illustrated in FIG. 4. In FIG. 4 the entire bar code image is shown. In actual practice, only a portion of the bar code need be imaged onto the photodiodes. An effective image width of 0.005 inch has been found suitable. As illustrated in the figure, the lower sensor 50 is located in the approximate center of the smaller bar of the code. The upper sensor 48 is located in the approximate center of the upper portion of the longer bar of the code.

Figure 5:
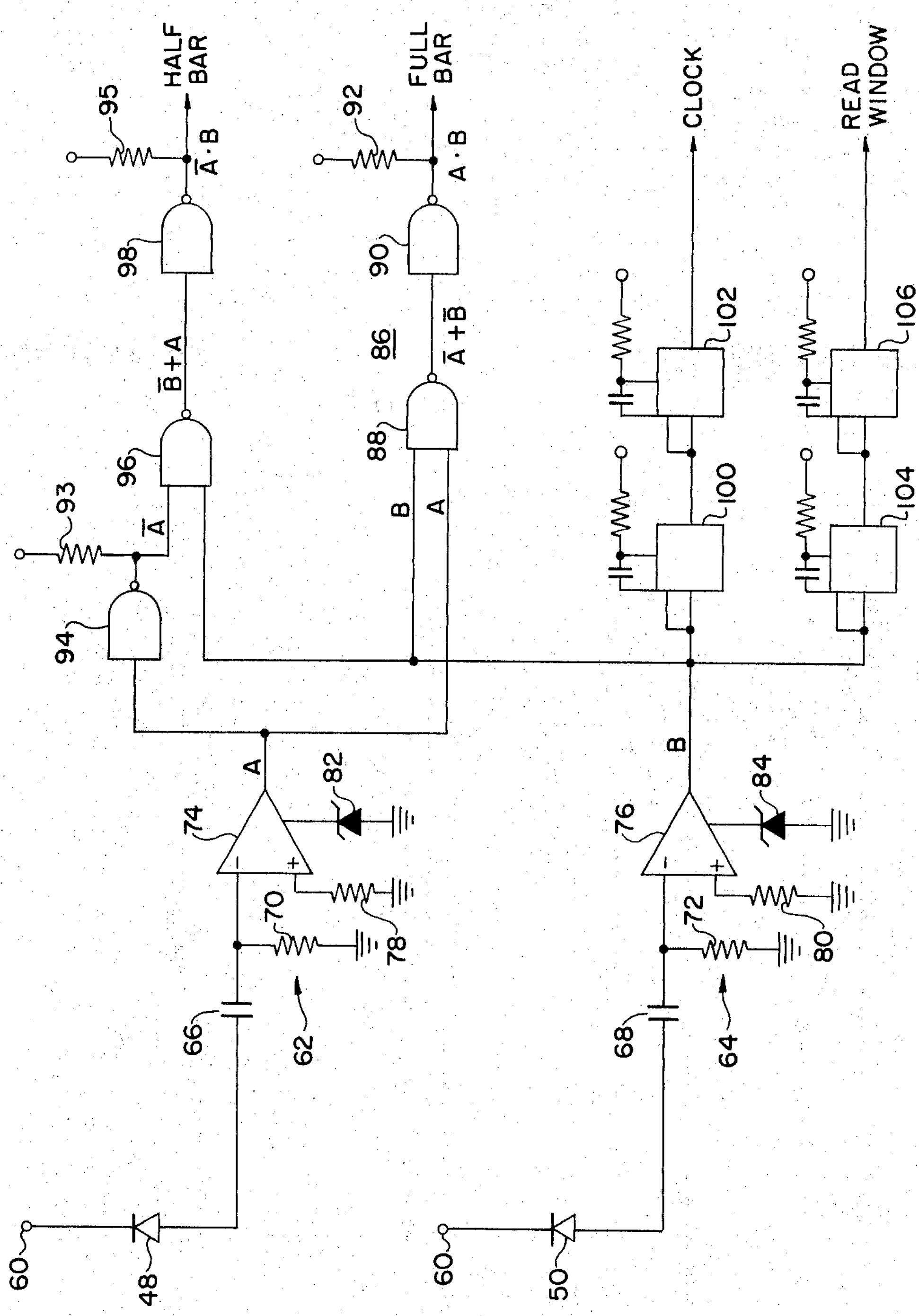
FIG. 5 is a circuit diagram of a bar code reader constructed according to the present invention.

FIG. 5 illustrates the preferred form of the invention is schematic form. The embodiment includes the two photodiodes 48 and 50, each connected at one end to a 5-volt supply 60 to reverse bias the photodiode. The other ends of the diodes are connected to operational amplifiers 74, 76 through differentiating circuits 62, 64 consisting of capacitors 66, 68 and shunt resistors 70, 72. The operational amplifiers 74, 76 are preferably inexpensive, limited bandwidth amplifiers which, because of their limited bandwidth character, eliminate a substantial amount of noise in the circuit. The differentiating circuits have been found particularly helpful in eliminating any adverse effects which might occur as a result of changes in the d.c. signal level of the photodiodes. The d.c. level, for example, can change with the color of the envelope.

The second input of each of the two operational amplifiers 74, 76 is connected to ground through 270K resistors 78, 80. The 270K resistors serve as a common mode rejection circuit which eliminates any noise (for example, from power supply or ground) common to both inputs of the operational amplifiers 74, 76. Each of the amplifiers also includes a limiting network 82, 84 which is specifically designed by the manufacturer for use with this particular kind of operational amplifier.

The signal from the two operational amplifiers 74, 76 are applied to various logic circuits to generate four output signals: (1) FULL BAR; (2) HALF BAR; (3) CLOCK; and (4) READ WINDOW. The FULL BAR signal corresponds to a full bar passing the two photosensors; the HALF BAR signal similarly corresponds to a smaller bar passing the lower photosensor; the CLOCK signal corresponds to either a full or half bar passing the lower photosensor; the READ WINDOW signal corresponds to the cessation of a bar code passing the photosensors and is used to conserve computer time where short messages and correspondingly short bar codes are encountered. It should be clear that all four signals are not essential to the invention, although they are used in the preferred embodiment. The system can, for example, be used with a full bar and the half bar or clock signal.

For most applications, including the preferred embodiments described herein, the full bar and half bar signals generated by the reader logic are digital "ones" when the appropriate bars pass the photosensors. In other words, a binary "one" at the full bar output represents a binary "one" of the bar code, whereas a binary "one" at the half bar output represents a binary "zero" of the bar code. The computer or other processing equipment then uses these signals is any desired manner.

The operation of the logic circuitry is illustrated by the A and B inputs and outputs of the various logic elements, A and B representing the digital outputs of the two operational amplifiers 74, 76.

In order to generate the full bar signal, the outputs A and B of the operational amplifiers 74, 76 are connected to a logic circuit 86 which consists of NAND-gate 88 and an inverter 90. The output of the inverter 90 is connected to the 5-volt supply through a 3K resistor 92 to increase its drive capability because a substantial length of connecting wires is involved. The NAND-gate 88 produces an $\bar{A} + \bar{B}$ signal at its output. When this signal is inverted by the inverter 90, it becomes $A \cdot B$; thus, the output of the inverter 90 is a digital "one" when A and B coincide, in other words, when a full bar passes the two photosensors.

To generate the half bar signal, that is, a signal corresponding to a half bar of a bar code, the output of operational amplifier 74 is connected to an inverter circuit 94, the output of which is connected to one input of NAND-gate 96. The other input to the NAND-gate 96 is supplied from the output of the operational amplifier 76. The output of NAND-gate 96 is connected through an inverter 98, the output of which constitutes the half bar signal.

As illustrated in the drawing, the output of the inverter 94 is an $\bar{A}$ signal which is supplied with the B signal to the input of the NAND-gate 96. The output of the NAND-gate 96 is then $\bar{B} + A$. The inverter 98 then inverts this signal to produce $B \cdot \bar{A}$ which is the half bar signal; in other words, the output of the inverter 98 is a digital "one" when a bar passes the lower photosensor but not the upper photosensor.

In order to generate a clock signal, the output of the operational amplifier 76, corresponding to the lower bar sensor 50, is simply applied through suitable delay and pulse-shaping circuits 100, 102. In the particular embodiment under consideration, the time-delay circuit 100 introduces a 40-microsecond delay and thee pulse-shaping circuit 102 generates an output pulse which is 10 microseconds wide. The effect of the time delay and pulse shaping is to generate a 10-microsecond clock pulse near the center of the full bar or half bar signals, each of which is on the order of 90 microseconds in length. The clock signal is generated every time a bar passes the lower photosensor and enables self-clocking operation of the computer or other processing circuitry to which the various outputs may be applied.

In order to generate the read window signal, the output of the lower bar amplifier 76 is applied to a second time-delay circuit 104, the output of which is connected to a pulse-shaping circuit 106. In the specific circuit shown, a retriggerable time delay 104 generates an output signal 200 microseconds after the last pulse received from the lower sensor amplifier 76. Before the last pulse is received, no signal is generated because the successive pulses, which are less than 200 microseconds apart, continually restart the delay period. The output of the retriggerable delay is applied to a pulse-shaping circuit 106 which generates a 10 microsecond read window signal indicating the cessation of the bar code.

The specifics of the read window circuitry are dependent to a large extent on the kind of equipment being fed by the reader and, in many cases, the signal is not required. The function of the signal is to provide an indication of the cessation of a bar code being read by the reader so that the computer or processing circuitry need not always be available for a period of time corresponding to the maximum length bar code.

The specific parts used for the various elements of the invention can quite obviously vary with the specific application. The photodiodes can be selected from a wide variety of sensors available from the Texas Instruments Company. Examples of suitable components are as follows:

Resistors
70, 72, 78, 80 270K
92, 93, 95 3K
Capacitors
66, 68 0.1 microfarad
Amplifiers
74, 76 National Semiconductor No. LM301
Limiters
82, 84 National Semiconductor No. LM103
Inverters
90, 94, 98 T.I. No. 7405
NAND-Gates
88, 96 T.I. No. 7,400
Monostable Multivibrators
100, 102, 104, 106 T.I. No. 74,122

The preferred embodiment of the bar code reader, as just described, can be used in a wide variety of applications, the printer-reader-sorter system of FIG. 1 being only one example. Additionally, the specific circuitry of the bar code reader can be varied to fit the particuar application.

What is claimed is:

1. A bar code reader for reading a code consisting of visual bars of at least two different lengths arranged in a side-by-side pattern with the bottoms of said bars being approximately arranged along a line, said code reader comprising:

a. first and second photosensors;
b. means supporting said photosensors in a line approximately parallel to the bars of said bar code;
c. means for moving an image of said bar code past said sensors, said motion being such as to move all of said bars past said first sensor and the longer portion of said longer bars past said second sensor, whereby said photosensors generate signals corresponding to the passage of said bars past said sensors;
d. differentiating means coupled to said photosensors for differentiating the signals generated by said sensors;
e. a first logic circuit coupled to said differentiating means for generating a signal corresponding to the differentiated signal from said first sensor;
f. a second logic circuit coupled to said differentiating means for generating a signal corresponding to the coincidence of said differentiated signals; and
g. a third logic circuit means coupled to said differentiating means for generating a signal corresponding to the presence of the differentiated signal of said first photosensor and the absence of the differentiated signal of said second photosensor.

2. A bar code reader for reading a code consisting of visual bars of at least two different lengths arranged in a side-by-side pattern on an envelope with the bottoms of said bars being approximately arranged along a line, said code reader comprising:

a. first and second photosensors;
b. means supporting said photosensors in a line approximately parallel to the bars of said bar code;
c. means for moving an image of said bar code past said sensors, said motion being such as to move all of said bars on said envelope past said first sensor and the longer portion of said longer bars past said second sensor, whereby said photosensors generate signals corresponding to the passage of said bars past said sensors;
d. differentiating means coupled to said photosensors for differentiating the signals generated by said sensors;
e. a first logic circuit coupled to said differentiating means for generating a signal corresponding to the differentiated signal from said first sensor;
f. a second logic circuit coupled to said differentiating means for generating a signal corresponding to the coincidence of said differentiated signals; and
g. a third logic circuit for generating a signal indicating the cessation of differentiated signals of said first photosensor.

3. A bar code reader for reading a code consisting of visual bars of two different lengths arranged in a side-by-side pattern on an envelope with the bottoms of said bars being approximately arranged along a line, said visual bars being comprised of full bars being on the order of 0.100 inch in height and half bars being on the order of 0.050 inch, the bar width and spacing between bars being on the order of 0.010 inch, said code reader comprising:

a. optical means including first and second photosensors positioned in a plane;
b. means for moving said envelope past said optical means to form an image of said code on said sensors, the bar width in said image being on the order of 0.005 inch, said motion being such as to move the images of all of said bars past said first sensor and the images of the longer portion of the longer bars past said second sensor, whereby said photosensors generate signals corresponding to the passage of said bars past said sensors;
c. first and second differentiating means coupled to said photosensors for differentiating the signals generated by said sensors;
d. first and second operational amplifiers coupled respectively to said first and second differentiating means for amplifying the differentiated signals;
e. a first logic circuit including a delay circuit coupled to said first operational amplifier for generating a delayed clock signal corresponding to the differentiated signal from said first sensor;

f. a second logic circuit coupled to said first and second operational amplifiers for generating a full-bar signal corresponding to the coincidence of the first and second differentiated signals;

g. a third logic circuit coupled to said first and second operational amplifiers for generating a half-bar signal corresponding to the presence of the first differentiated signal and the absence of the second differentiated signal; and h. a fourth logic circuit coupled to said first operational amplifier for generating a signal at a predetermined time after the cessation of said first differentiated signal.

* * * * *